Feb. 3, 1948.   E. H. HAUG   2,435,214
POWER FACTOR REGULATING APPARATUS
Filed Aug. 26, 1944
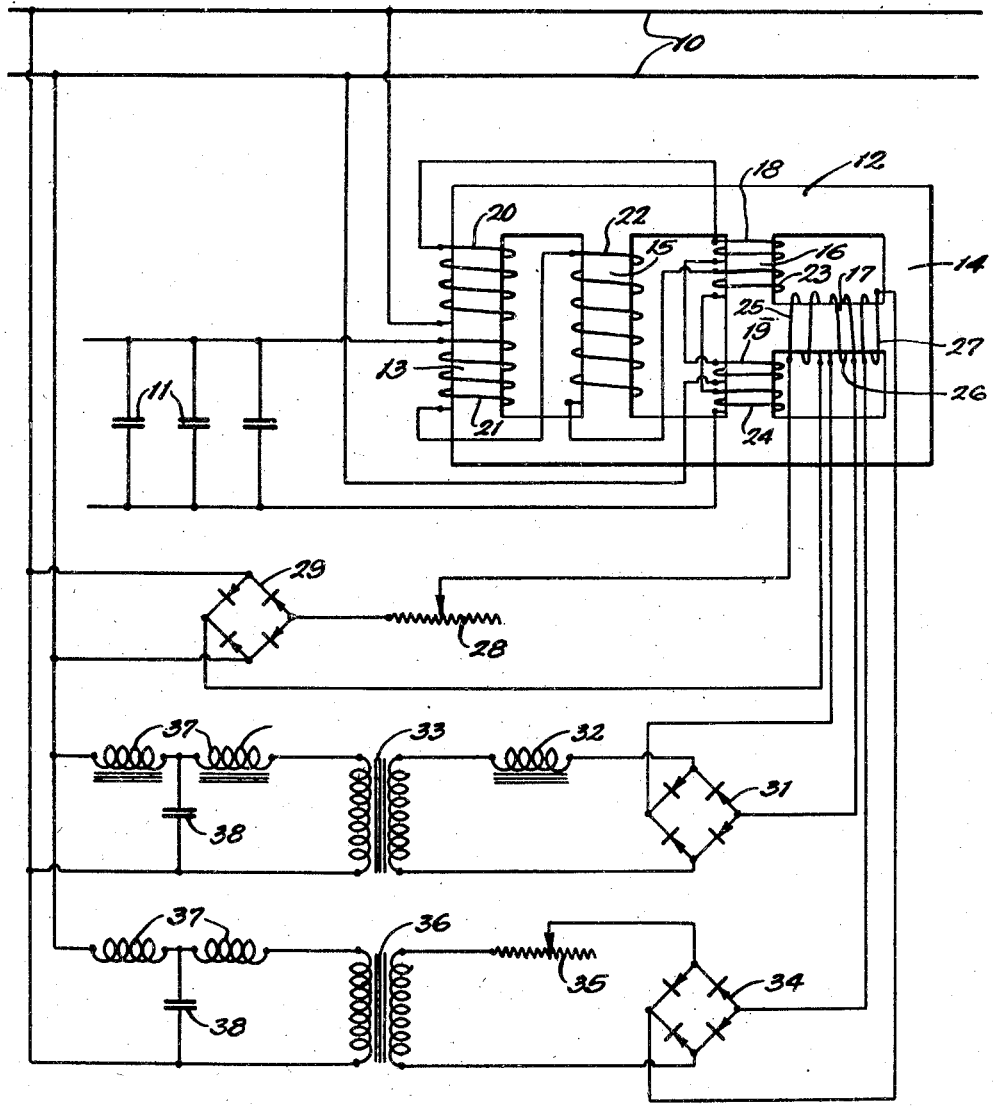
Inventor:
Eugene H. Haug,
By Dawson, Ooms and Borth,
Attorneys.

Patented Feb. 3, 1948

2,435,214

UNITED STATES PATENT OFFICE 2,435,214

POWER FACTOR REGULATING APPARATUS

Eugene H. Haug, Glencoe, Ill., assignor to La Salle National Bank, Chicago, Ill., as trustee Application August 26, 1944, Serial No. 551,338

2 Claims. (Cl. 172—246)

This invention relates to power factor regulating apparatus and more particularly to apparatus for regulating the power factor in an alternating current circuit to maintain it at or near unity when using rectifiers in the control circuit which are subject to aging.

One of the objects of the invention is to provide power factor regulating apparatus in which the amount of power factor correction is varied automatically in accordance with the demands of the load when using rectifiers in the control circuit which are subject to aging.

Another object of the invention is to provide power factor regulating apparatus in which a capacitor is connected to a power line thru a transformer whose coupling is automatically varied. Preferably the transformer coupling is varied by variably saturating a portion of the transformer core to vary the effective turn ratio between its primary and secondary when using rectifiers in the control circuit which are subject to aging.

Still another object is to provide power factor regulating apparatus in which saturation of a part of a transformer core is varied automatically in accordance with the voltage in the load circuit thru opposed saturating windings controlled respectively by a reactor and a resistor when using rectifiers in the control circuit which are subject to aging.

The above and other objects and advantages of the invention will be more readily apparent from the following description when read in connection with the accompanying drawing, in which the single figure is a circuit diagram of one form of apparatus embodying the invention.

The apparatus as shown is adapted to control the power factor in an alternating current circuit 10 which is connected to an inductive load such as a motor, transformer or the like. Leading current is introduced into the circuit 10 by connecting the circuit to one or more capacitors 11 thru a transformer. The transformer as shown, comprises a rectangular magnetic core 12 having end legs 13 and 14 and two intermediate legs 15 and 16. A cross leg 17 extends between the end leg 14 and the leg 16 as shown.

The leg 13 carries a main primary winding 20 connected to the circuit 10 and having in series therewith two smaller primary windings 18 and 19 wound on the leg 16 on opposite sides of the cross leg 17. The transformer secondary includes a winding 21 on the leg 13, a winding 22 on the leg 15 and two small windings 23 and 24 on the leg 16 on opposite sides of the cross leg 17. The several secondary windings are connected in series as shown with their output leads going to the capacitors 11.

In order to control the effective turn ratio between the primary and secondary windings on the transformer the leg 17 carries three saturating windings 25, 26 and 27. The winding 25 forms a base winding and is connected to the supply circuit 10 thru an adjustable resistor 28 and a rectifier 29. The winding 26 is wound oppositely to the winding 25 to form a buck winding while the winding 27 is wound similarly to the winding 25 to form a boost winding. The buck and boost windings 26 and 27 are variably supplied with current in accordance with voltage changes in the circuit 10 to vary the saturation of the cross leg 17 and thru it of the leg 16. The total number of primary turns on the transformer core is different than the number of secondary turns so that saturation of the core leg 16 will vary the effective ratio between the primary and secondary windings to vary the voltage impressed on the capacitors 11.

The buck winding 26 is supplied with direct current thru a rectifier 31 connected thru a reactor 32 with the secondary of a transformer 33. The primary of the transformer 33 is supplied with current from the circuit 10. The boost winding 27 is similarly supplied with direct current thru a rectifier 34 connected thru a resistor 35 with a secondary of a transformer 36 whose primary is connected to the circuit 10.

The transformers 33 and 36 may be connected directly to the circuit 10 but are preferably connected thru resonant type circuits including pairs of reactors 37 in series with condensers 38 connected across the circuit between them. This type of connection provides a somewhat sharper voltage response and is therefore preferred although the apparatus can operate satisfactorily if the rectifiers 31 and 34 are connected directly to the circuit 10 thru the reactor 32 and resistor 35.

In operation of the circuit when the voltage across the circuit 10 is at the desired value the current supplied to the buck and boost windings 26 and 27 will be equal with the transformer legs 16 and 17 only partially saturated. At this time, the voltage impressed across the capacitors 11 will be such that a leading current will be introduced into the line 10 sufficient to maintain its power factor at or near unity.

If there should be a voltage increase in the circuit 10 indicating an excess of leading current it is desired to reduce the voltage impressed on the condensers 11 to reduce the leading current. At this time, the current supplied to the buck winding 26 thru the reactor 32 will exceed the current supplied to the boost winding 27 thru the resistor 35 so that the effective saturation of the transformer core will be reduced. The primary windings 18 and 19 and the secondary windings 23 and 24, therefore, become more fully effective so that a greater number of primary turns relative to the number of secondary turns are effective. This reduces the turn ratio between the primary and secondary and reduces the voltage impressed on the condensers 11.

On a decrease in voltage in the circuit 10 more current will be supplied to the boost winding 27 than to the buck winding 26 more completely to saturate the transformer leg 16 so that the windings 18, 19, 23 and 24 become less effective. This reduces the effective number of primary turns relative to the secondary turns causing an increase in secondary voltage so that an increased leading current will be introduced into the load circuit. By the operation of the present apparatus the resonant circuits consisting of reactors 37 and capacitors 38 produce a current proportional to the voltage so as to prevent the disturbance of the regulation which will be produced by the aging of said rectifiers; and the current through said rectifiers will be the same and constant for a given voltage and independent of the resistance increase due to aging.

While one embodiment of the invention has been shown and described in detail herein, it will be understood that this is illustrative only and is not intended as a definition of the scope of the invention, reference being had for this purpose to the appended claims.

What is claimed is:

1. In combination with a power factor regulating apparatus, an alternating current supply, a saturating controlled transformer having three saturating windings, a number of primary windings serially connected, a number of secondary windings serially connected, a load taking a leading current, and three saturating control circuits, said load being connected to the output circuit of said secondary windings, said three saturating windings being so wound that one has a fixed polarity, the second having an additive polarity relation to the first, while the third has a subtractive polarity relation to the first, the first of said saturating windings which has a fixed polarity being connected to one of said saturating control circuits which consists of a bridge type rectifier with a variable resister connected to the output circuit of said rectifier, the second of said saturating windings which has an additive polarity being connected to one of said control circuits which consists of a T type resonant circuit for transforming constant potential to constant current, a current transformer in the output circuit of said resonant circuit, a variable resister in series circuit relation in the output circuit of said current transformer, and a bridge type rectifier, the third of said saturating windings which has a subtractive polarity being connected to one of said saturating control circuits which consists of a T type resonant circuit for transforming constant potential to constant current, a current transformer in the output circuit of said resonant circuit, a non-linear reactor in series circuit relation in the output circuit of said current transformer, and a bridge type rectifier, the input side of said three control circuits being connected to the same supply as that feeding said saturating current transformer, and having said resonant circuits and said variable resisters and non-linear reactor of an impedance which will control the amount of leading current from said supply by said saturating transformer proportional to the voltage of said supply.

2. In combination with a power factor regulating apparatus, an alternating current supply, a saturating controlled transformer having three saturating windings, a number of primary windings serially connected, a number of secondary windings serially connected, a load taking a leading current, and three saturating control circuits, said load being connected to the output circuit of said secondary windings, said three saturating windings being so wound that one has a fixed polarity, the second having an additive polarity relation to the first, while the third has a subtractive polarity relation to the first, the first of said saturating windings which has a fixed polarity being connected to one of said saturating control circuits which consists of a rectifier with a variable resister connected to the output circuit of said rectifier, the second of said saturating windings which has an additive polarity being connected to one of said control circuits which consists of a resonant circuit for transforming constant potential to constant current, a current transformer in the output circuit of said resonant circuit, a variable resister in series circuit relation in the output circuit of said current transformer, and a rectifier, the third of said saturating windings which has a subtractive polarity being connected to one of said saturating control circuits which consists of a resonant circuit for transforming constant potential to constant current, a current transformer in the output circuit of said resonant circuit, a non-linear reactor in series circuit relation in the output circuit of said current transformer, and a rectifier, the input side of said three control circuits being connected to the same supply as that feeding said saturating current transformer, and having said resonant circuits and said variable resisters and non-linear reactor of an impedance which will control the amount of leading current from said supply by said saturating transformer proportional to the voltage of said supply.

EUGENE H. HAUG.

REFERENCES CITED

The following references are of record in the file of this patent:

UNITED STATES PATENTS

| Number | Name | Date |
|---|---|---|
| 2,138,732 | Craig | Nov. 29, 1938 |
| 1,344,713 | Peters | June 29, 1920 |
| 513,370 | Steinmetz | Jan. 23, 1894 |

OTHER REFERENCES

"Electrical Engineering," Sept. 1936, pp. 956 to 960.